US009936060B2

(12) United States Patent
Raja et al.

(10) Patent No.: US 9,936,060 B2
(45) Date of Patent: Apr. 3, 2018

(54) APPARATUSES AND METHODS FOR PROVISIONING EMERGENCY SERVICES INFORMATION

(71) Applicant: QUALCOMM Incorporated, San Diego, CA (US)

(72) Inventors: Rajasekar Raja, Hyderabad (IN); Keemat Rai, Hyderabad (IN); Adiseshu Kumar Mylavaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/504,333

(22) Filed: Oct. 1, 2014

(65) Prior Publication Data
US 2016/0100045 A1    Apr. 7, 2016

(51) Int. Cl.
| | |
|---|---|
| *H04M 11/04* | (2006.01) |
| *H04M 1/725* | (2006.01) |
| *H04W 4/02* | (2018.01) |
| *H04W 4/22* | (2009.01) |
| *H04W 4/18* | (2009.01) |
| *H04W 76/00* | (2018.01) |

(52) U.S. Cl.
CPC ... *H04M 1/72541* (2013.01); *H04M 1/72572* (2013.01); *H04W 4/02* (2013.01); *H04W 4/22* (2013.01); *H04M 2242/04* (2013.01); *H04M 2242/15* (2013.01); *H04M 2242/30* (2013.01); *H04W 4/18* (2013.01); *H04W 76/007* (2013.01)

(58) Field of Classification Search
CPC ............................... H04W 4/22; H04W 48/10
USPC ............ 455/404.2, 456.1, 404.1, 344, 435.1, 455/456.3, 457, 414.2, 432.1, 411, 565; 340/539.11, 539.13
See application file for complete search history.

(56) References Cited

U.S. PATENT DOCUMENTS

| | | | |
|---|---|---|---|
| 6,766,159 B2 | 7/2004 | Lindholm | |
| 8,041,396 B2 | 10/2011 | Deubler et al. | |
| 2005/0148330 A1* | 7/2005 | Alberth, Jr. | ........... H04W 60/04 455/435.1 |
| 2005/0227666 A1 | 10/2005 | Cheng | |
| 2010/0120395 A1* | 5/2010 | Chiba | .................... H04W 4/22 455/404.2 |
| 2010/0124900 A1* | 5/2010 | Lui | .................. H04M 1/72541 455/404.2 |

(Continued)

FOREIGN PATENT DOCUMENTS

| | | |
|---|---|---|
| JP | 2005020109 A | 1/2005 |
| WO | WO-0141458 A2 | 6/2001 |

OTHER PUBLICATIONS

International Search Report and Written Opinion—PCT/US2015/051091—ISA/EPO—dated Nov. 9, 2015.

*Primary Examiner* — Kiet Doan
(74) *Attorney, Agent, or Firm* — Paradice and Li LLP

(57) ABSTRACT

Systems, methods, apparatuses, and media for the provision of emergency services information are provided. Embodiments include receiving emergency services information at a mobile device from a computing device of a cellular network to which the mobile device is in communication. Embodiments further include displaying, in response to input from a user of the mobile device, at least a portion of the emergency services information on a display screen of the mobile device.

21 Claims, 11 Drawing Sheets

(56) References Cited

U.S. PATENT DOCUMENTS

| | | | |
|---|---|---|---|
| 2010/0197351 A1* | 8/2010 | Ewell, Jr. | H04M 1/66 |
| | | | 455/565 |
| 2012/0100824 A1 | 4/2012 | Michael | |
| 2012/0302199 A1* | 11/2012 | Yamashita | H04W 4/22 |
| | | | 455/404.2 |
| 2013/0012155 A1* | 1/2013 | Forstall | H04M 3/42365 |
| | | | 455/404.2 |
| 2013/0225118 A1* | 8/2013 | Jang | H04W 4/22 |
| | | | 455/404.2 |
| 2014/0364150 A1* | 12/2014 | Marti | G01C 21/34 |
| | | | 455/456.3 |

* cited by examiner

APPARATUSES AND METHODS FOR PROVISIONING EMERGENCY SERVICES INFORMATION

FIELD

The present disclosure relates generally to communication systems and processes and more particularly, to receiving and displaying emergency services telephone numbers on mobile devices.

BACKGROUND

With standard mobile telephone devices, a user may place a call to an emergency services provider. A user may be familiar with one or more telephone numbers associated with emergency services in a geographic area where he regularly resides. In the case of an emergency, the user may dial from memory one of these emergency services telephone numbers. Additionally, a mobile telephone device may have one or more emergency services telephone numbers stored permanently on a storage medium of the device. These permanently stored emergency services telephone numbers may be associated with a particular geographic area with which the mobile telephone device is associated. In the case of an emergency, the user may press an emergency services dialing button provided on the device, whereby the mobile telephone device automatically dials one of the emergency services telephone numbers stored on the device.

However, issues arise when the user travels with the mobile telephone device to a geographic area where he does not regularly reside and with which the mobile telephone device is not associated. In these situations, the user may not be familiar with telephone numbers for emergency services in that geographic area. Additionally, the mobile telephone device may not have an emergency service telephone number stored on the device for that geographic area. Therefore, in the case of an emergency, the user may not be able to quickly contact emergency services because he cannot dial an emergency services telephone number.

SUMMARY

Embodiments of the present disclosure relate to systems, methods, apparatuses, and media for receiving and displaying emergency services telephone numbers on mobile devices.

According to an embodiment, a method for the provision of emergency services information is provided. The method includes receiving emergency services information at a mobile device from a computing device of a cellular network to which the mobile device is in communication. The method further includes displaying, in response to input from a user of the mobile device, at least a portion of the emergency services information on a display screen of the mobile device.

In some embodiments, the emergency services information includes a first emergency services telephone number, and a first emergency services description text corresponding to the first emergency services telephone number.

In some embodiments, the method includes displaying the first emergency services telephone number on the display screen of the mobile device and displaying the first emergency services description text on the display screen of the mobile device.

In some embodiments, the input from the user of the mobile device includes a signal received as a result of the user depressing and holding a button provided on the mobile device. In such embodiments, the button is predefined to correspond to a first type of emergency services. In such embodiments, the first emergency services telephone number and first emergency services description text correspond to the first type of emergency services.

In some embodiments, the emergency services information includes a plurality of emergency services telephone numbers, and a plurality of emergency services description texts, each emergency services description text in the plurality of emergency services description texts corresponding to an emergency services telephone number in the plurality of emergency services telephone numbers.

In some embodiments, the method includes displaying one or more emergency services description texts in the plurality of emergency services description texts on the display screen of the mobile device.

In some embodiments, the method includes displaying one or more emergency services telephone numbers from the plurality of emergency services telephone numbers corresponding to the one or more emergency services description texts on the display screen of the mobile device.

In some embodiments, the input from the user of the mobile device includes a signal received as a result of the user pressing an emergency services dialing button.

In some embodiments, the emergency services information is received at the mobile device from the computing device of the cellular network based on the computing device of the cellular network determining that the mobile device has newly entered a geographic area to which the cellular network is related.

In some embodiments, the computing device of the cellular network determines that the cellular mobile device has newly entered a geographic area to which the cellular network is related based on an indicator received from the mobile device.

According to an embodiment, a mobile device for the provision of emergency services information is provided. The mobile device includes a receiver of the mobile device configured to receive emergency services information from a computing device of a cellular network to which the mobile device is in communication. The mobile device further includes a display screen of the mobile device configured to display, in response to input from a user of the mobile device, at least a portion of the emergency services information.

In some embodiments, the emergency services information includes a first emergency services telephone number, and a first emergency services description text corresponding to the first emergency services telephone number.

In some embodiments, the display screen is configured to display the first emergency services telephone number on the display screen of the mobile device and display the first emergency services description text.

In some embodiments, the input from the user of the mobile device includes a signal received as a result of the user depressing and holding a button provided on the mobile device. In such embodiments, the button is predefined to correspond to a first type of emergency services. In such embodiments, the first emergency services telephone number and first emergency services description text correspond to the first type of emergency services.

In some embodiments, the emergency services information includes a plurality of emergency services telephone numbers, and a plurality of emergency services description texts, each emergency services description text in the plurality of emergency services description texts corresponding to an emergency services telephone number in the plurality of emergency services telephone numbers.

In some embodiments, the display screen is configured to display one or more emergency services description texts in the plurality of emergency services description texts.

In some embodiments, the display screen is configured to display one or more emergency services telephone numbers from the plurality of emergency services telephone numbers corresponding to the one or more emergency services description texts.

In some embodiments, the input from the user of the mobile device includes a signal received as a result of the user pressing an emergency services dialing button.

In some embodiments, the emergency services information is received at the mobile device from the computing device of the cellular network based on the computing device of the cellular network determining that the mobile device has newly entered a geographic area to which the cellular network is related.

In some embodiments, the computing device of the cellular network determines that the mobile device has newly entered a geographic area to which the cellular network is related based on an indicator received from the mobile device.

According to an embodiment, a mobile device for the provision of emergency services information is provided. The mobile device includes means for receiving emergency services information from a computing device of a cellular network to which the mobile device is in communication. In such embodiments, the mobile device includes means for displaying, in response to input from a user of the mobile device, at least a portion of the emergency services information.

In some embodiments, the emergency services information includes a first emergency services telephone number, and a first emergency services description text corresponding to the first emergency services telephone number.

In some embodiments, the mobile devices further comprises means for displaying the first emergency services telephone number and means for displaying the first emergency services description text.

In some embodiments, the input from the user of the mobile device includes a signal received as a result of the user depressing and holding a button provided on the mobile device. In such embodiments, the button is predefined to correspond to a first type of emergency services. In such embodiments, the first emergency services telephone number and first emergency services description text correspond to the first type of emergency services.

In some embodiments, the emergency services information includes a plurality of emergency services telephone numbers, and a plurality of emergency services description texts, each emergency services description text in the plurality of emergency services description texts corresponding to an emergency services telephone number in the plurality of emergency services telephone numbers.

According to an embodiment, a non-transitory computer-readable medium for the provision of emergency services information is provided. The medium includes instructions configured to cause one or more computing device to receive emergency services information at a mobile device from a computing device of a cellular network to which the mobile device is in communication. The instructions are further configured to cause the one or more computing device to display, in response to input from a user of the mobile device, at least a portion of the emergency services information on a display screen of the mobile device.

In some embodiments, the emergency services information includes a first emergency services telephone number, and a first emergency services description text corresponding to the first emergency services telephone number.

In some embodiments, the one or more computing device is caused to display the first emergency services telephone number on the display screen of the mobile device and display the first emergency services description text on the display screen of the mobile device.

In some embodiments, the input from the user of the mobile device includes a signal received as a result of the user depressing and holding a button provided on the mobile device. In such embodiments, the button is predefined to correspond to a first type of emergency services. In such embodiments, the first emergency services telephone number and first emergency services description text correspond to the first type of emergency services.

In some embodiments, the emergency services information includes a plurality of emergency services telephone numbers, and a plurality of emergency services description texts, each emergency services description text in the plurality of emergency services description texts corresponding to an emergency services telephone number in the plurality of emergency services telephone numbers.

DETAILED DESCRIPTION

Figure 1:
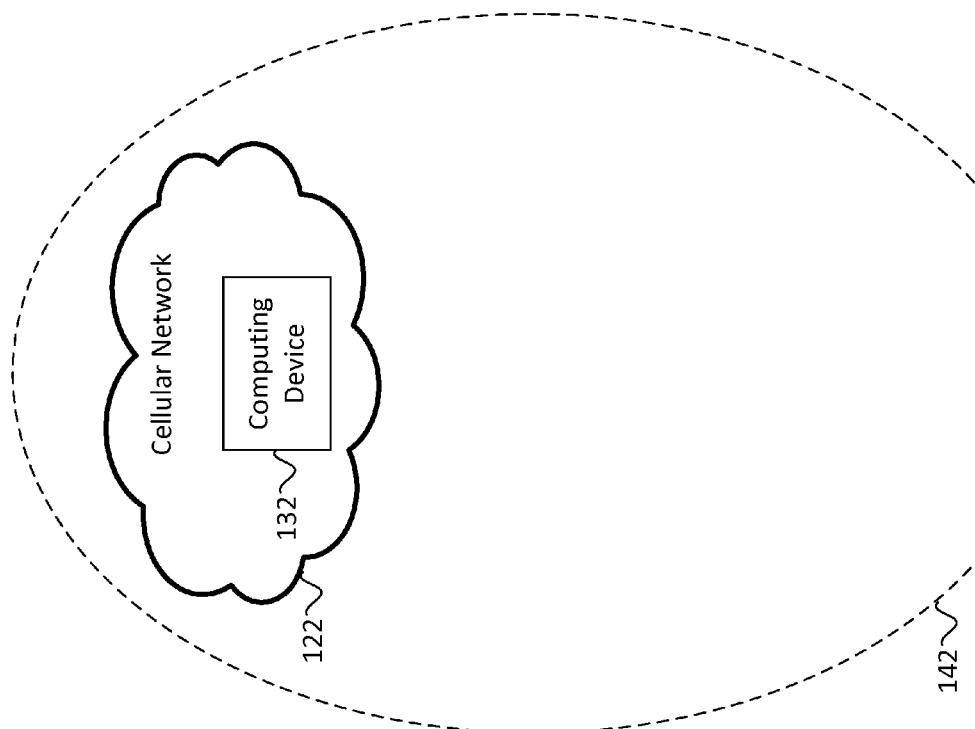
FIG. 1 is a diagram of a communication system according to some embodiments of the present disclosure.
Figure 1:
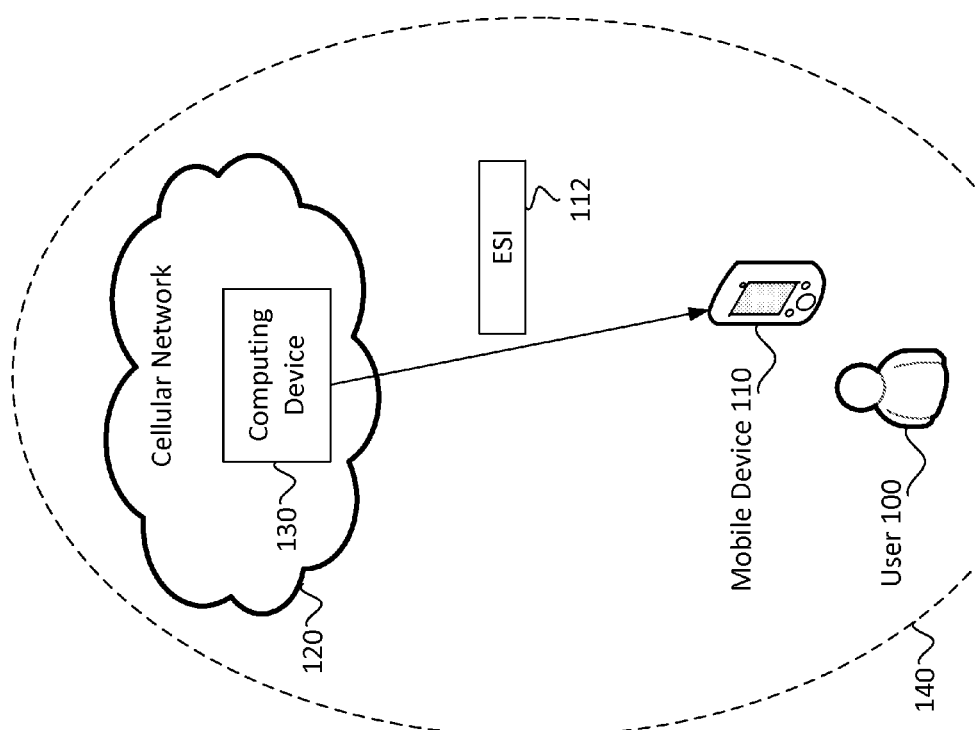

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof whether such elements are implemented as hardware or software depends upon the particular application and design constraints imposed on the overall system.

By way of example, an element, or any portion of an element, or any combination of elements may be implemented with "processing electronics" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

With the techniques disclosed herein, embodiments of the present disclosure improve over existing mobile telephone technologies in numerous aspects. First, the user has a more informative interface that shows the service being contacted and the phone number being used. This may be valuable in cases where the user would like to know in advance or after the fact what number is dialed. Second, the user may be able to request the appropriate emergency services more quickly. For instance, in the case of a robbery, the user may be able to specifically contact police services, which may save time that could be critical to the user receiving timely assistance in this emergency situation. The user may similarly be able to provision ambulance, fire, or other appropriate emergency services in a more timely fashion using these embodiments.

FIG. 1 is a diagram of a communication system according to some embodiments of the present disclosure. A user 100, mobile device 110, emergency services information 112, cellular networks 120 and 122, computing devices 130 and 132, and geographic areas 140 and 142 are shown.

Mobile device 110 may be provided in a variety of forms according to various embodiments of the present disclosure. Mobile device 110 may be any of a variety of mobile electronic devices that are capable of placing telephone calls. As such, mobile device 110 may be a smartphone, cellular telephone, tablet computer, etc.

User 100 may be any form of user of mobile device 110 in various embodiments of the present disclosure. As such, user 100 may be an owner, regular user, intermittent user, etc. of mobile device 110.

Cellular network 120 may be provided in a variety of forms according to various embodiments of the present disclosure. Cellular network 120 may be any telephone network to which mobile device 110 may connect in order to place a telephone call. As such, cellular network 120 may be a CDMA network, a GSM network, a 3GPP network, etc. Cellular network 122 may be similarly provided.

Computing device 130 may be provided in a variety of forms according to various embodiments of the present disclosure. Computing device 130 may be any device provided as part of or associated with cellular network 120 that can communicate with mobile device 110. A such, computing device 130 may be a gateway computing device, a mobile switching center ("MSC"), a base station controller ("BSC"), a radio network controller ("RNC"), an Evolved Node B ("eNodeB"), etc. Computing device 132 may be similarly provided with respect to cellular network 122.

Geographic area 140 may be provided in a variety of forms according to various embodiments of the present disclosure. Geographic area 140 may be any geographic area with which cellular network 120 may be associated. As such, geographic area 140 may be a particular country, a set of numerous countries, a subset of a country, etc. Geographic area 142 may be similarly provided with respect to cellular network 122.

Based on these elements, an operation of the system can be described for some embodiments of the present disclosure. Mobile device 110 may be configured to receive emergency services information 112 from computing device 130. The emergency services information 112 may include one or more telephone numbers associated with emergency services available in geographic area 140. The emergency services information 112 may further include one or more description texts associated with emergency services available in geographic area 140. Other elements of information may be included in the emergency services information 112 in various embodiments of the present disclosure. With the emergency services information 112 received at the mobile device 110, the mobile device 110 may display some or all of the emergency services information 112 to the user 100 on a display screen provided as part of the mobile device 110. The mobile device 110 may be triggered to display this information based on some input from the user 100, such as the user 100 pressing a physical or virtual button provided on the mobile device 110. In this way, the system may allow the mobile device 110 to receive emergency services information 112 from the cellular network 120 and display it to the user 100 using the mobile device 110. The user 100 may then place a telephone call to request emergency services based on the display of this information.

In some situations, the user 100 may place a telephone call to request emergency services based on other sources of information as to emergency services. For instance, if geographic area 140 is a geographic area where the user 100 regularly resides, then the user 100 may directly dial a memorized telephone number using a number pad to request emergency services. As another instance, if geographic area 140 is a geographic area with which mobile device 110 is associated, then the user 100 may dial a telephone number for emergency services that is stored in a memory device of mobile device 110.

Figure 2:
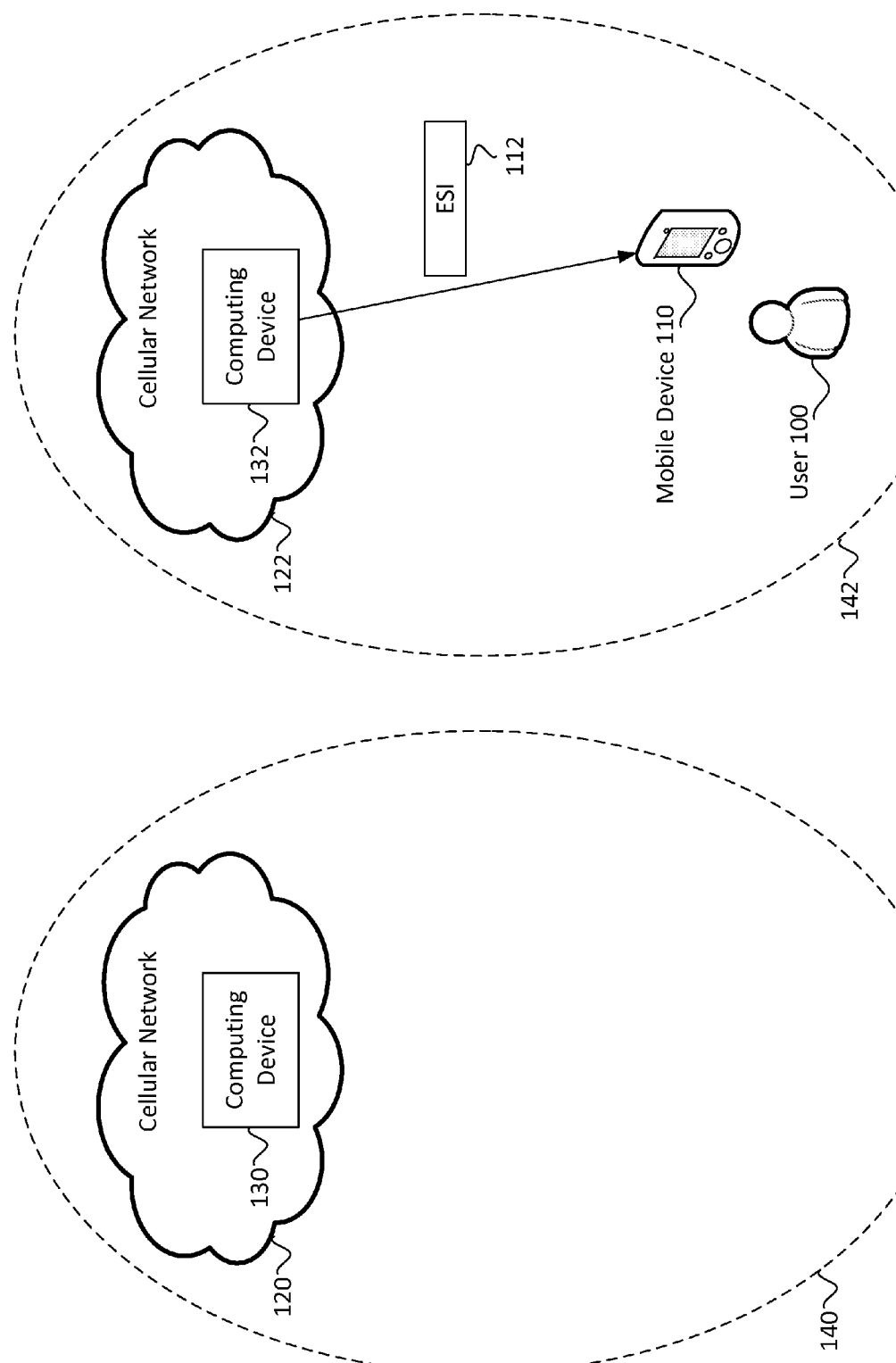
FIG. 2 is a diagram of a communication system according to some embodiments of the present disclosure.

However, when the user 100 moves with the mobile device 110 to geographic area 142, which is not a geographic area where the user 100 regularly resides and not a geographic area with which the mobile device 110 is associated, the user may not have any emergency services telephone numbers memorized or stored on the mobile device 110. This situation is shown in FIG. 2. In this situation, the computing device 132 as part of cellular network 142 may provide emergency services information 112 to mobile device 110 as described for computing device 130 and cellular network 140. Mobile device 110 may then display some or all of the received emergency services information 112 on a display of mobile device 110 as described above. In this way, the user 100 may place a telephone call to request emergency services using the reception and display of emergency services information 112 as described above. Furthermore, because the user 100 may have no memorized or stored emergency services telephone numbers, this may be the only sufficiently rapid option for the user 100 to request emergency services.

In some embodiments, the emergency services information 112 may be related to various types of emergency services. A type of emergency service may be a typical form of emergency service commonly provided in numerous geographic areas. For example, some types of emergency services may be: general purpose emergency services (such as a single national number like 911), police or other law enforcement services, firefighting services, ambulance or other medical services, etc. In some embodiments, the emergency services information 112 may include tuples of information of the form: <telephone number, description text, type of service>. An example may be: <955, national ambulance hotline, medical>. In some embodiments, the emergency services information may include tuples of information of the form: <telephone number, description text/ type of service>, where a single element is used to define a description text and a type of service. An example may be: <955, ambulance>. In other embodiments, tuples of information of different forms may be used, such as only a telephone number, a telephone number and a description text, a telephone number and a type of service, etc.

Figure 3:
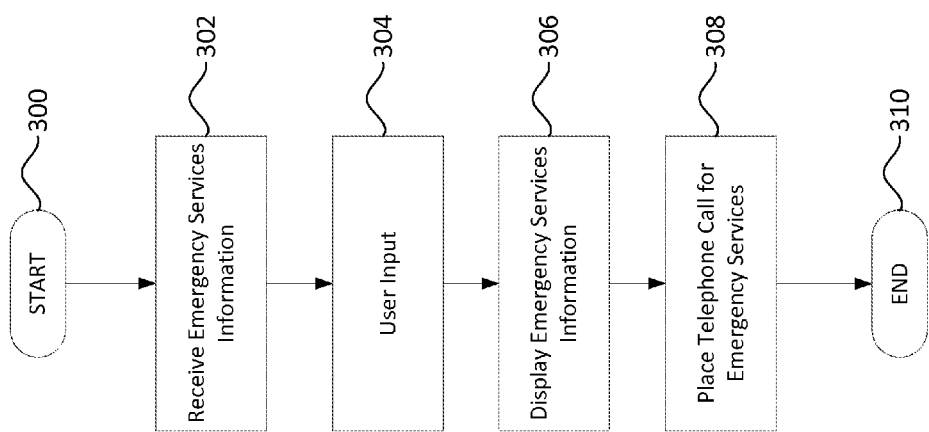
FIG. 3 is a flowchart of a process for receiving and displaying emergency services information according to some embodiments of the present disclosure.

FIG. 3 is a flowchart of a process for receiving and displaying emergency services information according to some embodiments of the present disclosure. The process begins at step 300.

The process continues at step 302. At step 302, emergency services information is received. This step may involve a mobile device receiving emergency services information from a computing device as part of a cellular network to which the mobile device is connected. The mobile device may receive the emergency services information in a control message from the computing device of the cellular network. The mobile device may receive the emergency services information in a data packet from the computing device of the cellular network. In various embodiments, other techniques for receiving the emergency services information may be used.

The process continues at step 304. At step 304, a user provides an input. This step may involve a user of a mobile device providing an input by interacting with a physical or virtual button provided as part of the mobile device. The mobile device may receive this input from the user as any of a variety of input signals that the mobile device may then process.

The process continues at step 306. At step 306, emergency services information is displayed. This step may be performed in response to the user input discussed with respect to the previous step. This step may involve displaying some or all of the emergency services information on a display screen of a mobile device, where the emergency services information was received at the mobile device from a computing device of a cellular network. This step may be performed so as to inform a user of the mobile device of various emergency services that are available in the user's present geographic area. Towards that end, the information displayed may include telephone numbers and description texts for emergency services that are available. The user may be able to use this information to choose an emergency service that should be contacted for a present emergency situation in which the user finds himself.

The process continue at step 308. At step 308, a telephone call is placed for emergency services. The step may be performed based on the user choosing an emergency service that should be contacted based on the emergency services information displayed, as discussed with respect to the previous step. Based on the telephone call being placed, the user may be able to request and receive appropriate emergency services assistance to deal with a present emergency situation in which the user finds himself.

The process ends at step 310.

Figure 4:
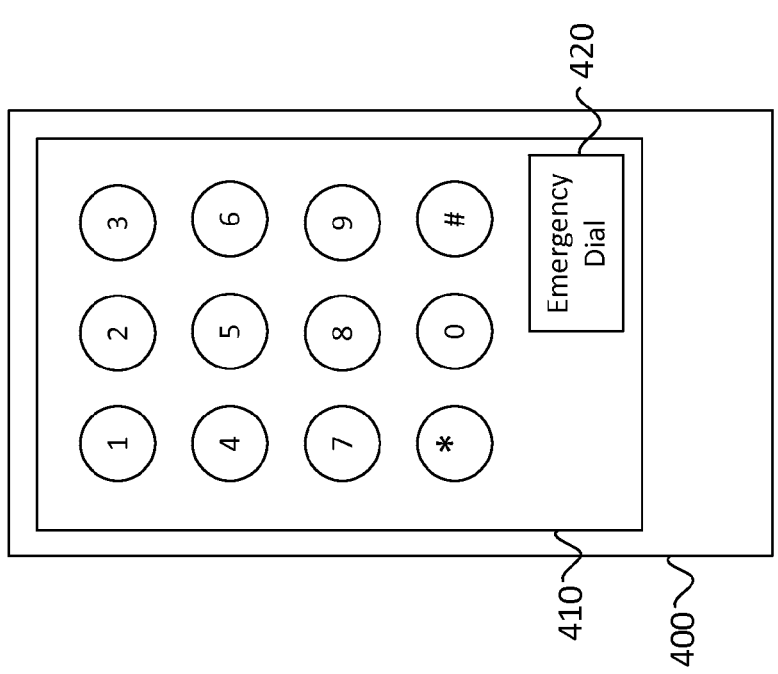
FIG. 4 is a user interface for user input according to some embodiments of the present disclosure.

FIG. 4 is a user interface for user input according to some embodiments of the present disclosure. A mobile device 400, a display screen 410 of the mobile device, an emergency services dialing button 420, and other elements are shown. The elements of this figure may be used for user input. A user may be able to press emergency services dialing button 420 in order to indicate a desire to place a telephone call to emergency services. A signal reflecting the user pressing emergency services dialing button 420 may then be received by mobile device 400, in which case the signal may be processed to cause the display of emergency services information as shown in other figures of the present disclosure. Emergency services dialing button 420 may be provided as a virtual button, such as shown in this figure, or as a physical button provided as part of mobile device 400. Other forms of receiving a user input indicating a desire to place a telephone call to emergency services may be used in other embodiments of the present disclosure.

Figure 5:
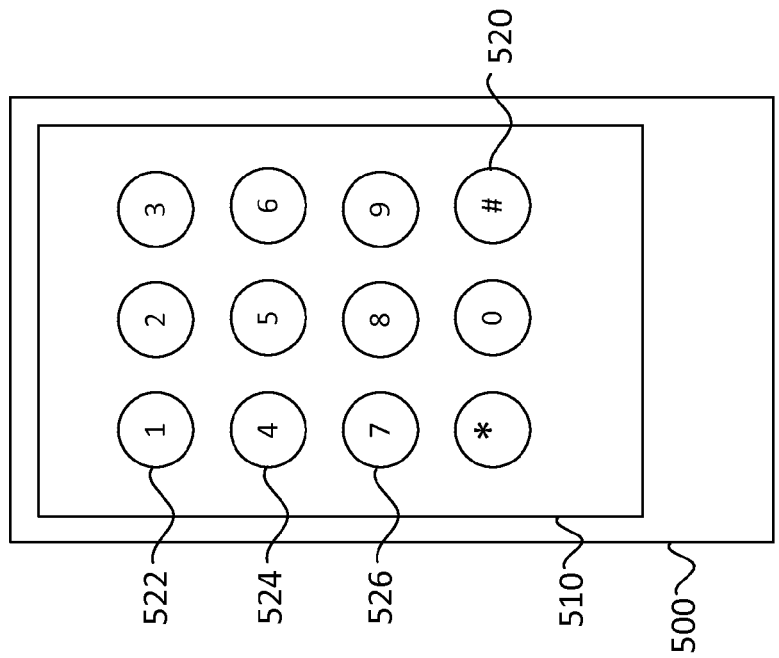
FIG. 5 is a user interface for user input according to some embodiments of the present disclosure.

FIG. 5 is a user interface for user input according to some embodiments of the present disclosure. A mobile device 500, a display screen 510 of the mobile device, keypad buttons 520, 522, 524, and 526, and other elements are shown. The elements of this figure may be used for user input. A user may be able to press and hold any of the keypad buttons 520, 522, 524, and 526 in order to indicate a desire to place a telephone call to a particular type of emergency service. Each of the keypad buttons 520, 522, 524, and 526 may be predefined to correspond to a particular type of emergency service. While pressing any of keypad buttons 520, 522, 524, and 526 may indicate a desire to enter the displayed character using the keypad (#, 1, 2, 3), pressing and holding any of keypad buttons 520, 522, 524, and 526 may indicate a desire to place a telephone call to the predefined type of emergency service. By way of example: keypad button 520 may correspond to a national, general purpose type of emergency service; keypad button 522 may correspond to a law enforcement type of emergency service; keypad button 524 may correspond to a medical type of emergency service; and keypad button 526 may correspond to a firefighting type of emergency service. A signal reflecting this user input may then be received by mobile device 500, in which case the signal may be processed to cause the display of emergency services information as shown in other figures of the present disclosure. Keypad buttons 520, 522, 524, and 526 may be provided as virtual buttons, physical buttons, or in some other form. Other forms of receiving a user input indicating a desire to place a telephone call to a particular type of emergency services may be used in other embodiments of the present disclosure.

Figure 6:
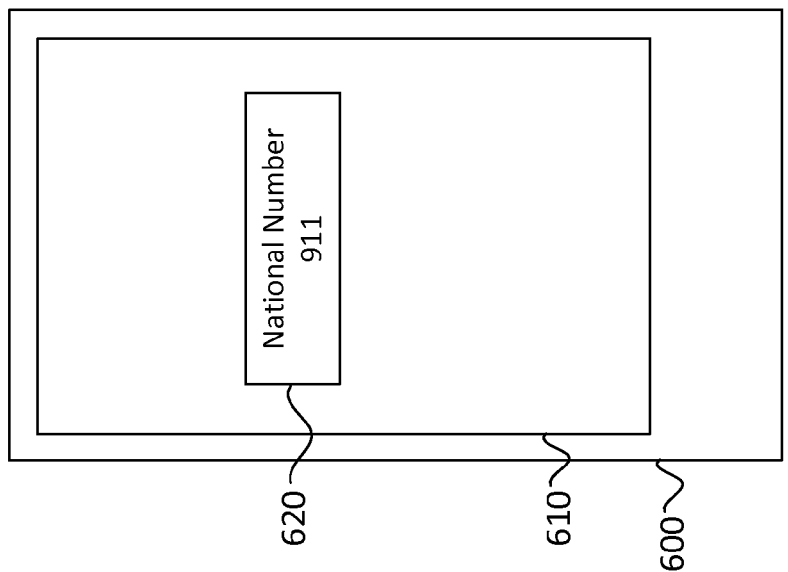
FIG. 6 is a user interface for displaying emergency services information according to some embodiments of the present disclosure.

FIG. 6 is a user interface for displaying emergency services information according to some embodiments of the present disclosure. A mobile device 600, a display screen 610 of the mobile device, and button 620 are shown. The elements of this figure may be used for displaying emergency services information to a user of the mobile device 600. The button 620 may contain within its display field portions of the emergency services information received by the mobile device 600. For example, a telephone number and a description text may be shown. In the present figure, "911" as shown may be a telephone number and "National Number" as shown may be a description text. In other embodiments of the present disclosure, "National Number" may be a service type or a description text and a service type. The display of button 620 and the emergency services information contained therein may be in response to user input, such as that previously described. As an example, a user that presses emergency services dialing button 420 of FIG. 4 may be presented with button 620 where the present geographic area of the user and mobile device 600 has only the one emergency service telephone number available. As another example, a user that presses and holds keypad button 520 of FIG. 5 may be presented with button 620 where keypad button 520 is predefined to correspond to the type of the emergency services information shown in button 620. The user may be able to press button 620 to indicate a desire to place a telephone call to the emergency service corresponding to that displayed in button 620. Mobile device 600 may receive a signal reflecting the pressing of button 620 and thereby place a telephone call to the telephone number corresponding to button 620.

Figure 7:
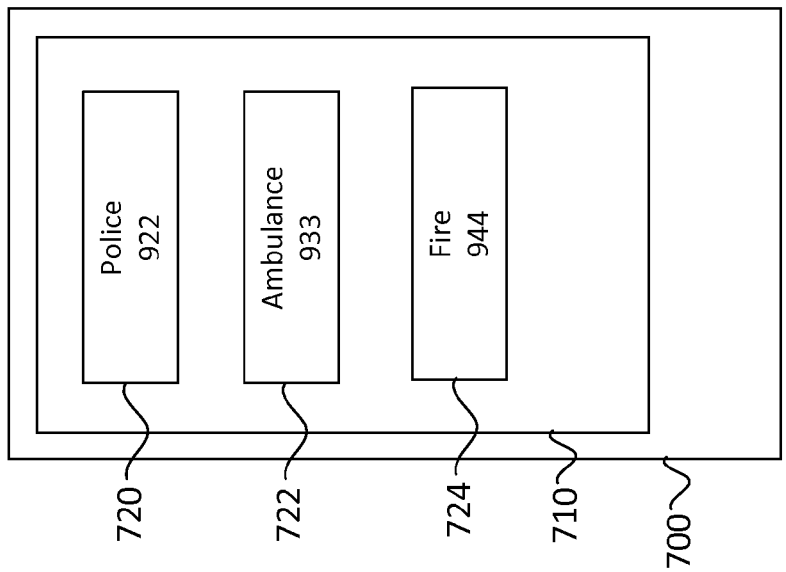
FIG. 7 is a user interface for displaying emergency services information according to some embodiments of the present disclosure.

FIG. 7 is a user interface for displaying emergency services information according to some embodiments of the present disclosure. A mobile device 700, a display screen 710 of the mobile device, and buttons 720, 722, and 724 are shown. The elements of this figure may be used for displaying emergency services information to a user of the mobile device 700. The buttons 720, 722, and 724 may contain within its display field portions of the emergency services information received by the mobile device 700. For example, "922," "933," and "944" as shown may be telephone numbers. Continuing the example, "Police," "Ambulance," and "Fire" as shown may be description texts and/or service types corresponding to the telephone numbers with which they are displayed. The display of buttons 720, 722, and 724 and the emergency services information contained therein may be in response to user input, such as that previously described. As an example, a user that presses emergency services dialing button 420 of FIG. 4 may be presented with button 720 where the present geographic area of the user and mobile device 700 has the three emergency service telephone numbers available as shown. The user may be able to press any of buttons 720, 722, and 724 to indicate a desire to place a telephone call to the emergency service corresponding to that displayed within the button pressed. Mobile device 700 may receive a signal reflecting the pressing of the button and thereby place a telephone call to the telephone number corresponding to the button pressed.

Figure 8:
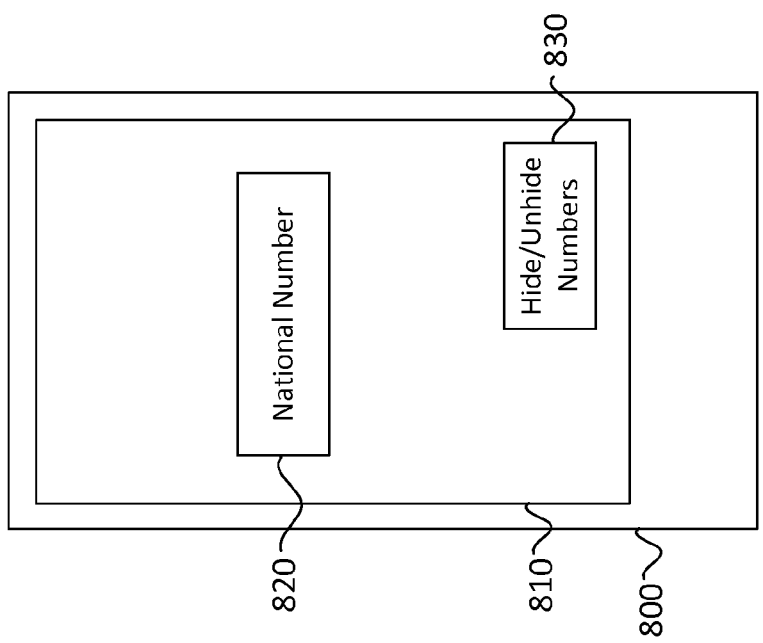
FIG. 8 is a user interface for displaying emergency services information according to some embodiments of the present disclosure.

FIG. 8 is a user interface for displaying emergency services information according to some embodiments of the present disclosure. A mobile device 800, a display screen 810 of the mobile device, and buttons 820 and 830 are shown. The elements of this figure may be used for displaying emergency services information to a user of the mobile device 800. The button 820 may contain within its display field portions of the emergency services information received by the mobile device 800. As shown, a subset of the emergency services information available may be displayed. For example, while similar emergency services information may be available with respect to button 820 as were described with respect to button 620 of FIG. 6, only a description text and/or service type is displayed. This may be preferred in some embodiments, as a user of mobile device 800 may recognize the description text or service type that is desired without any ability or need to see the corresponding telephone number. However, in order to enable the user to view the telephone number, button 830 may act as a toggle button to hide and unhide the telephone number information. The features of this figure may then otherwise be used as similar features shown and described with respect to FIG. 6.

Figure 9:
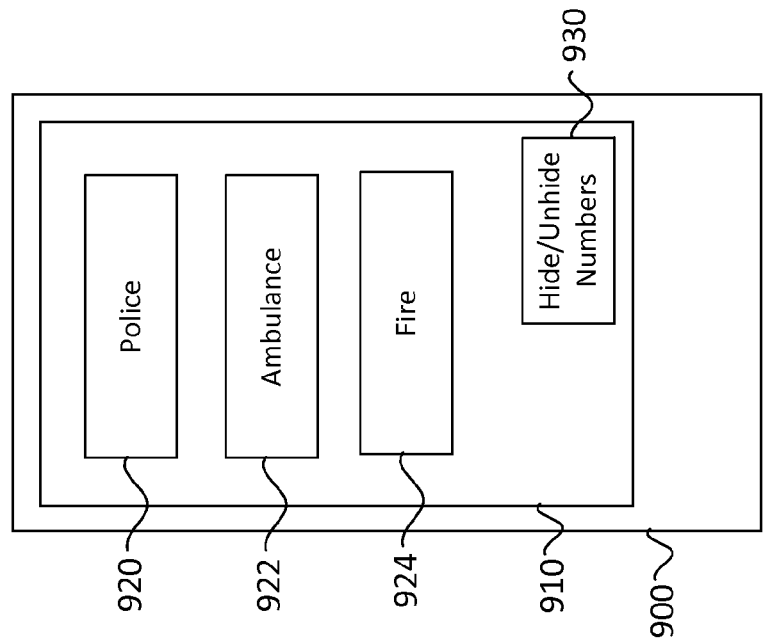
FIG. 9 is a user interface for displaying emergency services information according to some embodiments of the present disclosure.

FIG. 9 is a user interface for displaying emergency services information according to some embodiments of the present disclosure. A mobile device 900, a display screen 910 of the mobile device, and buttons 920, 922, 924, and 930 are shown. The elements of this figure may be used for displaying emergency services information to a user of the mobile device 900. The buttons 920, 922, and 924 may contain within their display fields portions of the emergency services information received by the mobile device 900. As shown, a subset of the emergency services information available may be displayed. For example, while similar emergency services information may be available with respect to buttons 920, 922, and 924 as were described with respect to buttons 720, 722, and 724 of FIG. 7, only a description text and/or service type is displayed. This may be preferred in some embodiments, as a user of mobile device 900 may recognize the description text or service type that is desired without any ability or need to see the corresponding telephone number. However, in order to enable the user to view the telephone number, button 930 may act as a toggle button to hide and unhide the telephone number information. The features of this figure may then otherwise be used as similar features shown and described with respect to FIG. 7.

Figure 10:
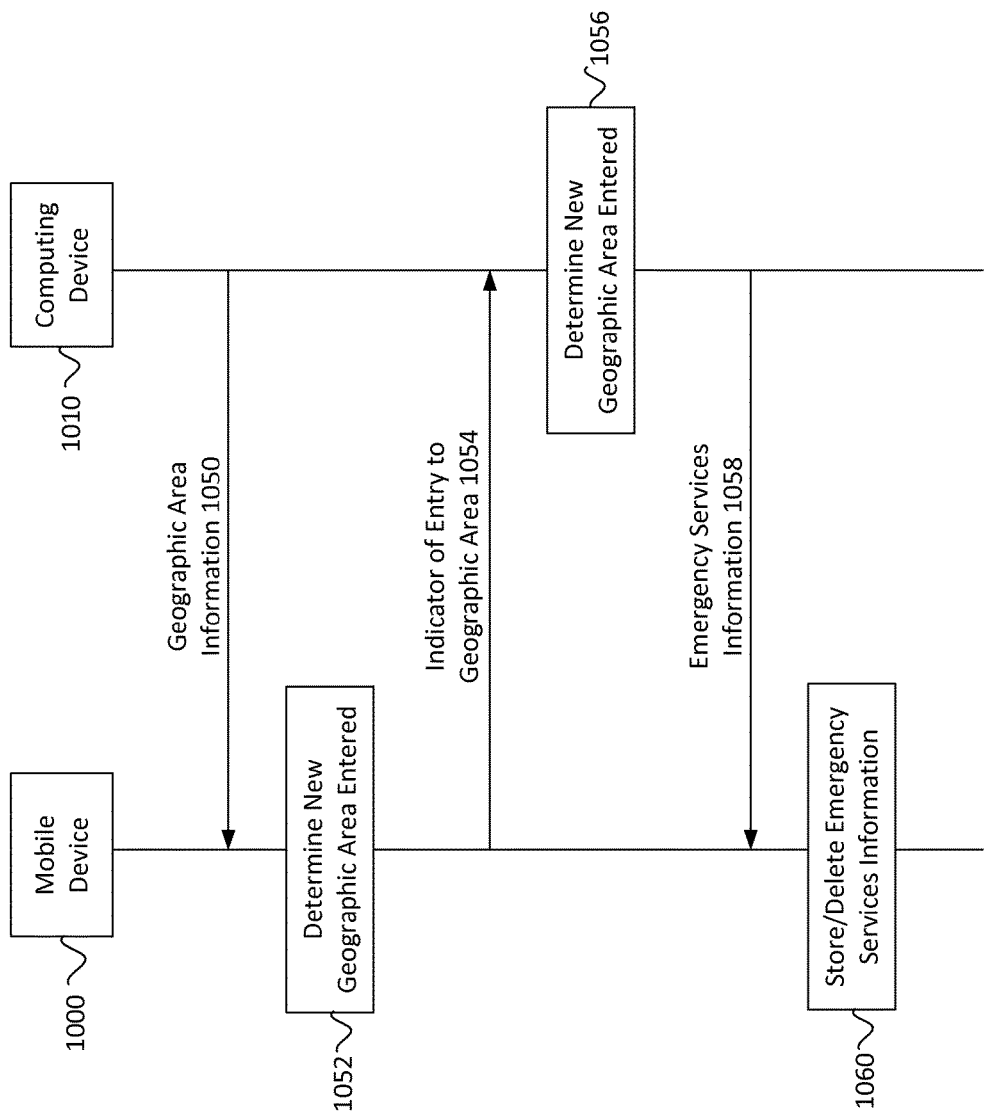
FIG. 10 is a sequence diagram showing a process for receiving emergency services information according to some embodiments of the present disclosure.

FIG. 10 is a sequence diagram showing a process for receiving emergency services information according to some embodiments of the present disclosure. Mobile device 1000 and computing device 1010 are shown. Computing device 1010 may be a computing device belonging to a cellular network, such as computing devices discussed elsewhere in the present disclosure. The process of this figure may take place in time after mobile device 1000 has entered into a geographic area associated with the cellular network of which computing device 1010 belongs. For example, the process of this figure may take place shortly after mobile device 1000 is carried by a user from a country A (home country) into a country B (foreign country) during international travel. In this example, the cellular network to which the computing device 1010 belongs may be associated with the foreign country. Further for this example, mobile device 1000 may have stored thereon emergency services information for country A where it was recently located but not for country B where it is presently located.

As the process begins, mobile device 1000 receives geographic area information 1050 from computing device 1010. Geographic area information 1050 may be any information indicating the geographic area in which the mobile device 1000 is located. Geographic area information 1050 may be any information indicating the geographic area associated with the cellular network to which computing device 1010 belongs. For example, geographic area information 1050 may include a Mobile Country Code ("MCC") value as part of the MCC/Mobile Network Code ("MNC") pair that identifies the cellular network to which computing device 1010 belongs. Mobile device 1000 may receive the geographic area information 1050 by receiving a broadcast message or receiving any other sort of message from computing device 1010.

As the process continues, mobile device 1000 determines at step 1052 that a new geographic area has been entered. Mobile device 1000 may make this determination by comparing the geographic area information 1050 received from computing device 1010 to a geographic area identifier stored on the mobile device 1000. This geographic area identifier may indicate the geographic area that is a home geographic area for the mobile device 1000. This geographic area identifier may indicate a geographic area for which the mobile device 1000 most recently received emergency services information.

As the process continues, the mobile device 1000 transmits an indicator of entry to a new geographic area 1054 to the computing device 1010. Having determined in step 1052 that the mobile device 1000 has newly entered the geographic area associated with the cellular network to which the computing device 1010 belongs, the mobile device 1000 may transmit the indicator of entry to a new geographic area 1054 to the computing device 1010 in order to alert computing device 1010 to this situation. The indicator of entry to a new geographic area 1054 may be transmitted in a variety of ways. The indicator of entry to a new geographic area 1054 may be transmitted as part of a substantially dedicated message for the purpose of communicating this indicator. The indicator of entry to a new geographic area 1054 may be transmitted by modifying one or more bits or other message parts of an existing message type used in conventional cellular systems to perform communication between mobile devices and computing device 1010. A variety of other techniques for transmitting the indicator of entry to a new geographic area 1054 may be used in various embodiments of the present disclosure.

As the process continues, computing device 1010 determines at step 1056 that the mobile device 1000 has newly entered the geographic area associated with the cellular network to which the computing device 1010 belongs. Computing device 1010 may make this determination based on receipt of the indicator of entry to a new geographic area 1054 received from mobile device 1000. A variety of other techniques for making the determination of step 1056 may be used in various embodiments of the present disclosure.

As the process continues, the computing device 1010 transmits emergency services information 1058 to the mobile device 1000. Having determined in step 1056 that the mobile device 1000 has newly entered the geographic area associated with the cellular network to which the computing device 1010 belongs, the computing device 1010 may transmit emergency services information 1058 in order to provide mobile device 1000 with emergency services information that is accurate for the geographic area that the mobile device 1000 has newly entered. The emergency services information 1058 may be transmitted in a variety of ways. The emergency services information 1058 may be transmitted as part of a substantially dedicated message for the purpose of communicating this information. The emergency services information 1058 may be transmitted by modifying one or more message parts of an existing message type used in conventional cellular systems to perform communication between mobile devices and computing device 1010. A variety of other techniques for transmitting the emergency services information 1058 may be used in various embodiments of the present disclosure.

As the process continues, the mobile device 1000 stores and/or deletes emergency services information at step 1060. Based on receiving emergency services information 1058 for the geographic area where the mobile device 1000 is presently located, the mobile device 1000 may store the emergency services information 1058 on a storage medium provided as part of mobile device 1000. Based on receiving emergency services information 1058 for the geographic area where the mobile device 1000 is presently located or based on the determination of step 1052, the mobile device 1000 may determine that it is presently storing emergency services information for another geographic area in which the mobile device 1000 is no longer located. As such, mobile device 1000 may delete this information from a storage medium provided as part of mobile device 1000.

In this way, the process of this figure allows the mobile device 1000 to receive emergency services information from a computing device 1010 belonging to a cellular network associated with a geographic area to which the mobile device 1000 has newly entered. In various embodiments, minor variations of the process just described may be made while still conforming with the present disclosure. As an example, while various steps and actions are described with respect to a single computing device 1010, it should be understood that more than one computing device belonging to a cellular network may perform those steps and actions in various embodiments of the present disclosure.

Figure 11:
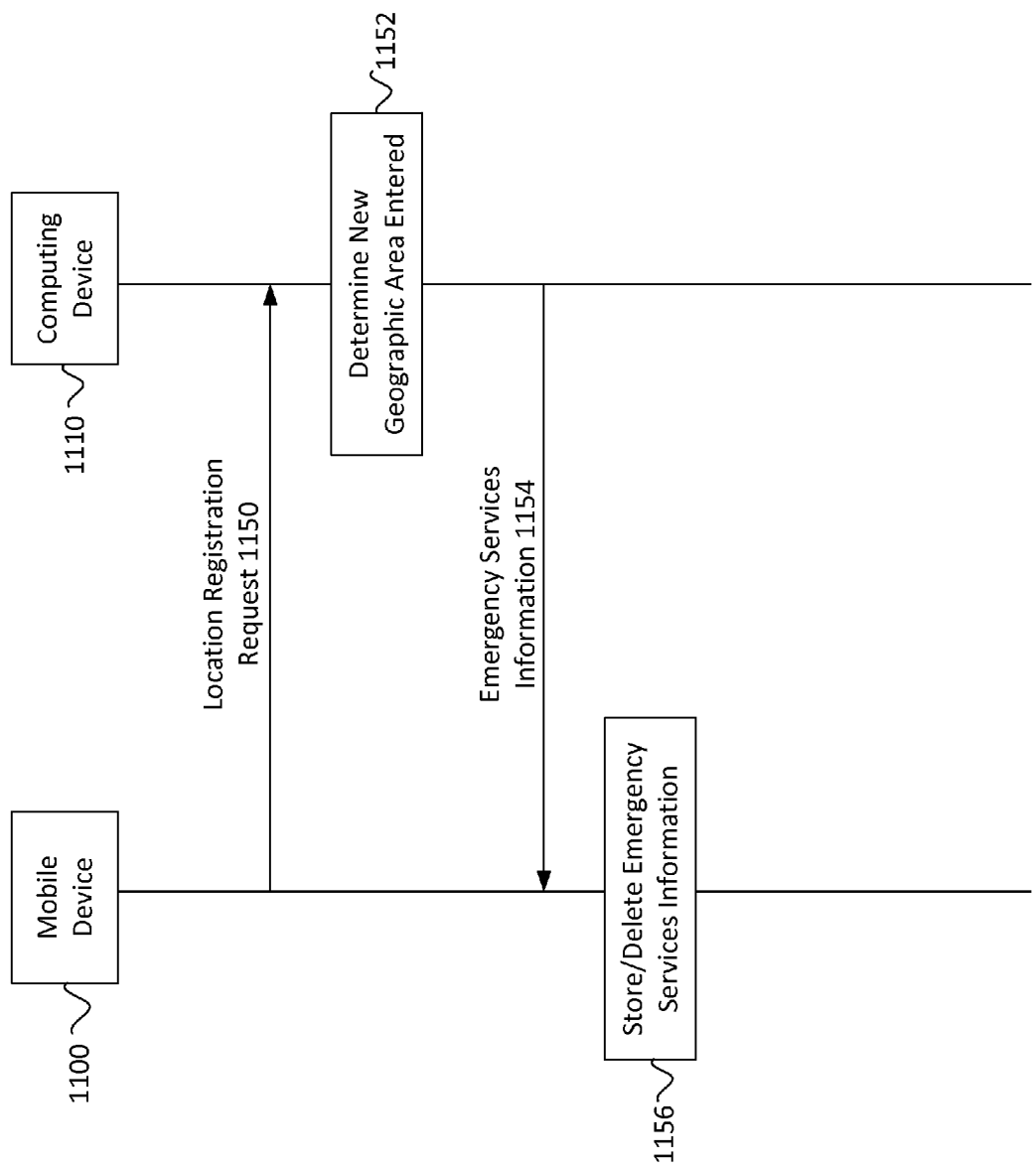
FIG. 11 is a sequence diagram showing a process for receiving emergency services information according to some embodiments of the present disclosure.

FIG. 11 is a sequence diagram showing a process for receiving emergency services information according to some embodiments of the present disclosure. Mobile device 1100 and computing device 1110 are shown. Computing device 1110 may be a computing device belonging to a cellular network, such as computing devices discussed elsewhere in the present disclosure. The process of this figure may take place in time after mobile device 1100 has entered into a geographic area associated with the cellular network of which computing device 1110 belongs. For example, the process of this figure may take place shortly after mobile device 1100 is carried by a user from a country A (home country) into a country B (foreign country) during international travel. In this example, the cellular network to which the computing device 1110 belongs may be associated with the foreign country. Further for this example, mobile device 1100 may have stored thereon emergency services information for country A where it was recently located but not for country B where it is presently located.

As the process begins, mobile device 1100 transmits a location registration request to the computing device 1110. Without any particular determination that a new geographic area has been entered and without any consideration of emergency services information stored on the mobile device 1100, the mobile device 1100 may attempt to perform a standard location registration process based on movement between cells and/or cellular networks. Therefore, mobile device 1100 may transmit a standard location registration request 1150 used in conventional cellular networks to computing device 1110.

As the process continues, computing device 1110 determines at step 1152 that the mobile device 1100 has newly entered the geographic area associated with the cellular network to which the computing device 1110 belongs. Computing device 1110 may make this determination based on performing a location registration process initiated by the receipt of the location registration request 1150. For example, computing device 1110 may determine based on information retrieved from a home location register or similar component for the mobile device 1100 that the mobile device 1100 has newly entered the geographic area associated with the cellular network to which the computing device 1110 belongs because it is not a geographic area associated with the home network for the mobile device 1100. A variety of other techniques for making the determination of step 1152 may be used in various embodiments of the present disclosure.

As the process continues, the computing device 1110 transmits emergency services information 1154 to the mobile device 1100. Having determined in step 1152 that the mobile device 1100 has newly entered the geographic area associated with the cellular network to which the computing device 1110 belongs, the computing device 1110 may transmit emergency services information 1154 in order to provide mobile device 1100 with emergency services information that is accurate for the geographic area that the mobile device 1100 has newly entered. The emergency services information 1154 may be transmitted in a variety of ways. The emergency services information 1154 may be transmitted as part of a substantially dedicated message for the purpose of communicating this information. The emergency services information 1154 may be transmitted by modifying one or more message parts of an existing message type used in conventional cellular systems to perform communication between mobile devices and computing device 1110. A variety of other techniques for transmitting the emergency services information 1154 may be used in various embodiments of the present disclosure.

As the process continues, the mobile device 1100 stores and/or deletes emergency services information at step 1156. Based on receiving emergency services information 1154 for the geographic area where the mobile device 1100 is presently located, the mobile device 1100 may store the emergency services information 1154 on a storage medium provided as part of mobile device 1100. Based on receiving emergency services information 1154 for the geographic area where the mobile device 1100 is presently located, the mobile device 1100 may determine that it is presently storing emergency services information for an other geographic area in which the mobile device 1100 is no longer located. As such, mobile device 1100 may delete this information from a storage medium provided as part of mobile device 1100.

In this way, the process of this figure allows the mobile device 1100 to receive emergency services information from a computing device 1110 belonging to a cellular network associated with a geographic area to which the mobile device 1100 has newly entered. In various embodiments, minor variations of the process just described may be made while still conforming with the present disclosure. As an example, while various steps and actions are described with respect to a single computing device 1110, it should be understood that more than one computing device belonging to a cellular network may perform those steps and actions in various embodiments of the present disclosure.

Figure 12:
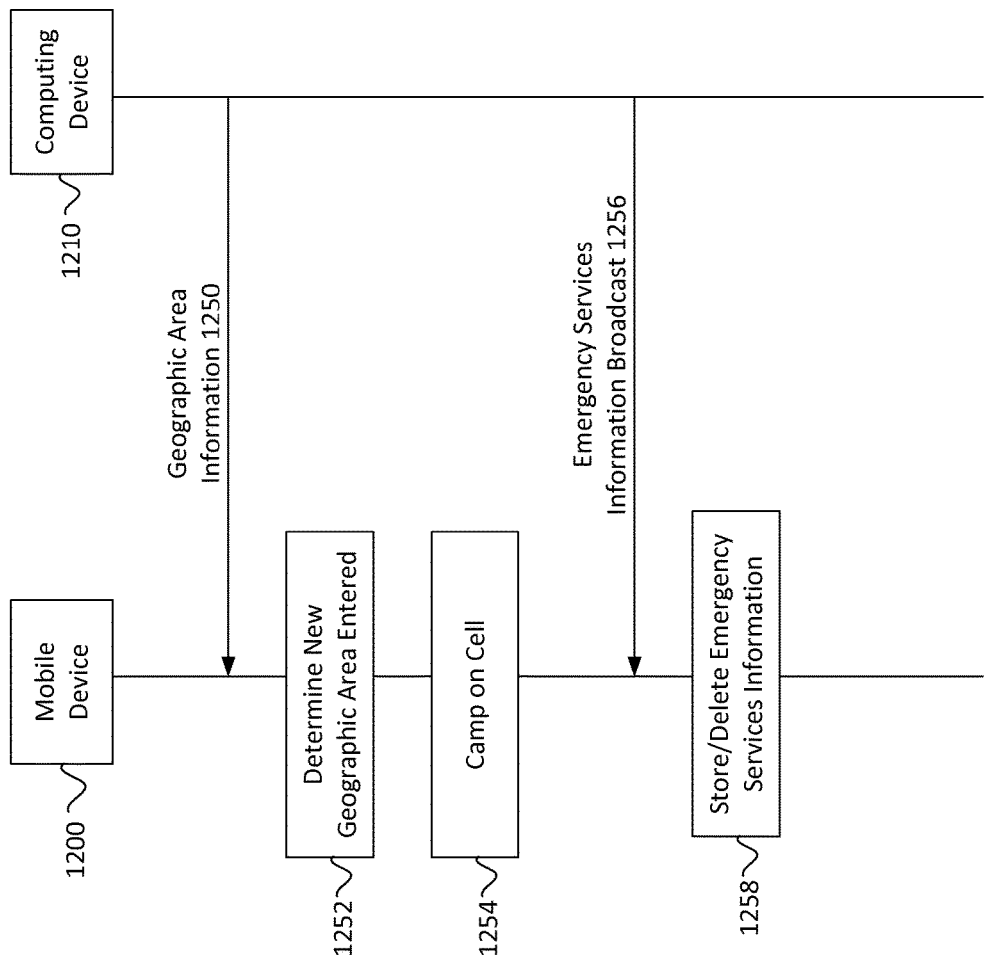
FIG. 12 is a sequence diagram showing a process for receiving emergency services information according to some embodiments of the present disclosure.

FIG. 12 is a sequence diagram showing a process for receiving emergency services information according to some embodiments of the present disclosure. Mobile device 1200 and computing device 1210 are shown. Computing device 1210 may be a computing device belonging to a cellular network, such as computing devices discussed elsewhere in the present disclosure. The process of this figure may take place in time after mobile device 1200 has entered into a geographic area associated with the cellular network of which computing device 1210 belongs. For example, the process of this figure may take place shortly after mobile device 1200 is carried by a user from a country A (home country) into a country B (foreign country) during international travel. In this example, the cellular network to which the computing device 1210 belongs may be associated with the foreign country. Further for this example, mobile device 1200 may have stored thereon emergency services information for country A where it was recently located but not for country B where it is presently located.

As the process begins, mobile device 1200 receives geographic area information 1250 from computing device 1210. Geographic area information 1250 may be any information indicating the geographic area in which the mobile device 1200 is located. Geographic area information 1250 may be any information indicating the geographic area associated with the cellular network to which computing device 1210 belongs. For example, geographic area information 1250 may include a Mobile Country Code ("MCC") value as part of the MCC/Mobile Network Code ("MNC") pair that identifies the cellular network to which computing device 1210 belongs. Mobile device 1200 may receive the geographic area information 1250 by receiving a broadcast message or receiving any other sort of message from computing device 1210.

As the process continues, mobile device 1200 determines at step 1252 that a new geographic area has been entered. Mobile device 1200 may make this determination by comparing the geographic area information 1250 received from computing device 1210 to a geographic area identifier stored on the mobile device 1200. This geographic area identifier may indicate the geographic area that is a home geographic area for the mobile device 1200. This geographic area identifier may indicate a geographic area for which the mobile device 1200 most recently received emergency services information.

As the process continues, the mobile device 1200 camps on a cell of the cellular network to which computing device 1210 belongs. Having determined in step 1252 that the mobile device 1200 has newly entered the geographic area associated with the cellular network to which the computing device 1210 belongs, the mobile device 1200 may determine to camp on a cell of the cellular network to which computing device 1210 belongs in order to make use of minimal services available in a camped mode. While in a camped mode, mobile device 1200 may be able to receive broadcast message from the cellular network to which computing device 1210 belongs and make emergency telephone calls through the cellular network to which computing device 1210 belongs.

As the process continues, the mobile device 1200 receives an emergency services information broadcast 1256 from computing device 1210. The emergency services information broadcast 1256 may be a periodic broadcast of emergency services information transmitted by computing device 1210. Mobile device 1200 may be able to receive emergency services information broadcast 1256 based on being camped on a cell of the cellular network to which computing device 1210 belongs.

As the process continues, the mobile device 1200 stores and/or deletes emergency services information at step 1258. Based on receiving emergency services information broadcast 1256 for the geographic area where the mobile device 1200 is presently located, the mobile device 1200 may store the information from the emergency services information broadcast 1256 on a storage medium provided as part of mobile device 1200. Based on receiving emergency services information broadcast 1256 for the geographic area where the mobile device 1200 is presently located or based on the determination of step 1252, the mobile device 1200 may determine that it is presently storing emergency services information for an other geographic area in which the mobile device 1200 is no longer located. As such, mobile device 1200 may delete this information from a storage medium provided as part of mobile device 1200.

Figure 13:
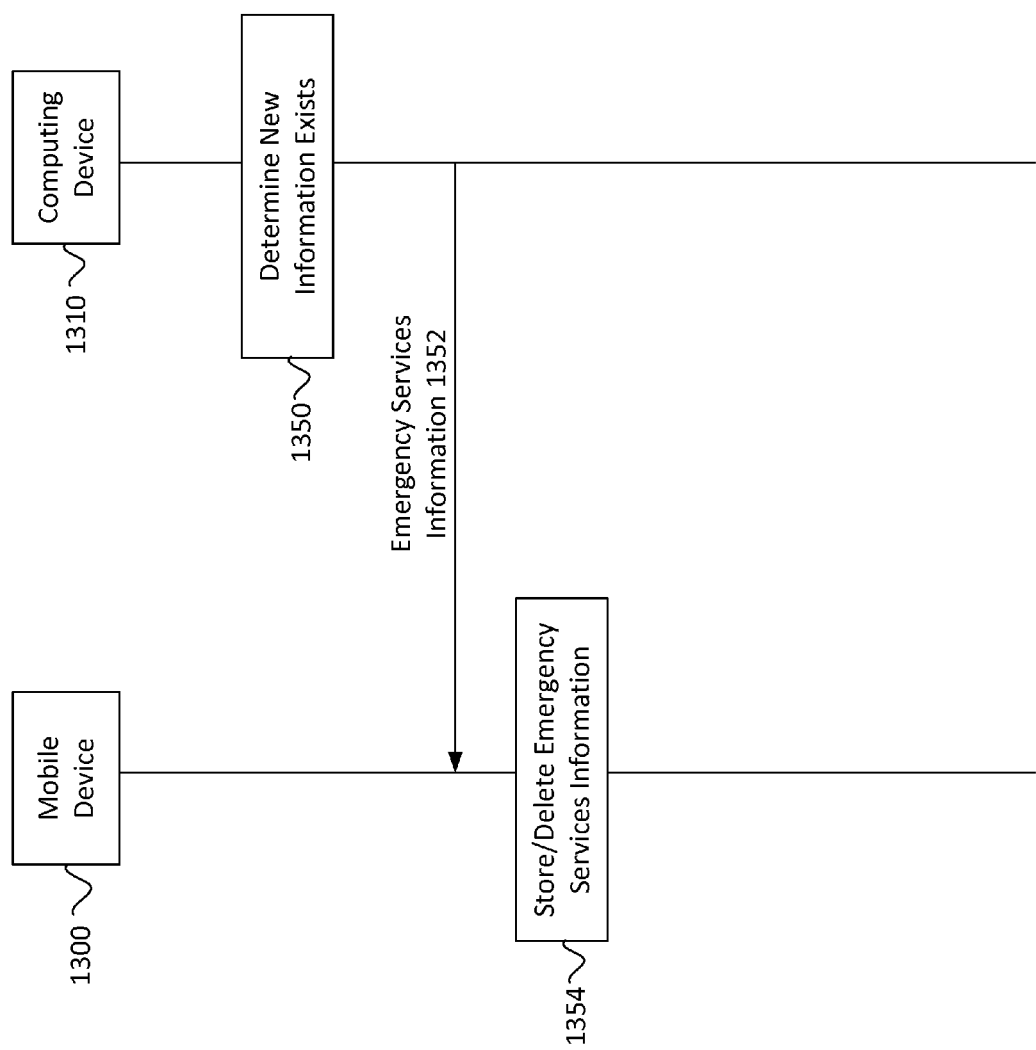
FIG. 13 is a sequence diagram showing a process for receiving emergency services information according to some embodiments of the present disclosure.

FIG. 13 is a sequence diagram showing a process for receiving emergency services information according to some embodiments of the present disclosure. Mobile device 1300 and computing device 1310 are shown. Computing device 1310 may be a computing device belonging to a cellular network, such as computing devices discussed elsewhere in the present disclosure. The process of this figure may take place in time after mobile device 1300 has already received emergency services information from computing device 1310. For example, mobile device 1300 may have already received emergency services information for a geographic area in which it is presently located and which is associated with a cellular network to which computing device 1310 belongs. This may have been performed through a processes such as those described elsewhere in the present disclosure.

As the process beings, the computing device 1310 determines at step 1350 that new emergency services information exists for the geographic area associated with the cellular network to which the computing device 1310 belongs. This determination may be made based on a message received from some other component of the cellular network, based on a message received from some other source, or in some other way. The new emergency services information may include an update to a phone number, description text, or service type of an emergency service for which information was previously available. The new emergency services information may include information on a new emergency service that is newly available in the geographic area. The new emergency services information may include information on a previous emergency service that is no longer available in the geographic area, i.e., an update to the emergency services information may be removing a subset of the information. As one example of new emergency services information, a new emergency service may be created in the case of a natural disaster, like a tsunami, in the geographic area. This may be a central hotline for victims of the natural disaster to contact for various needs. A variety of other forms of new emergency services information may be used in various embodiments of the present disclosure.

As the process continues, the mobile device 1300 receives emergency services information 1352 from computing device 1310. Computing device 1310 may transmit the emergency service information 1352 in order to provide updated emergency services information (reflecting the new emergency services information) to mobile devices connected to the cellular network to which computing device 1310 belongs. The emergency services information 1352 may be a periodic broadcast of emergency services information transmitted by computing device 1310.

As the process continues, the mobile device 1300 stores and/or deletes emergency services information at step 1354. Based on receiving emergency services information 1352, the mobile device 1300 may store the information from the emergency services information 1352 on a storage medium provided as part of mobile device 1300. Based on receiving emergency services information 1352, the mobile device 1300 may determine that it is presently storing emergency services information for the same geographic area that is now inaccurate. As such, mobile device 1300 may delete this information from a storage medium provided as part of mobile device 1300.

In this way, the process of this figure allows the mobile device 1300 to receive emergency services information from a computing device 1310 belonging to a cellular network associated with a geographic area in which the mobile device 1300 was already located but for which new emergency services information is available. In various embodiments, minor variations of the process just described may be made while still conforming with the present disclosure. As an example, while various steps and actions are described with respect to a single computing device 1310, it should be understood that more than one computing device belonging to a cellular network may perform those steps and actions in various embodiments of the present disclosure.

Figure 14:
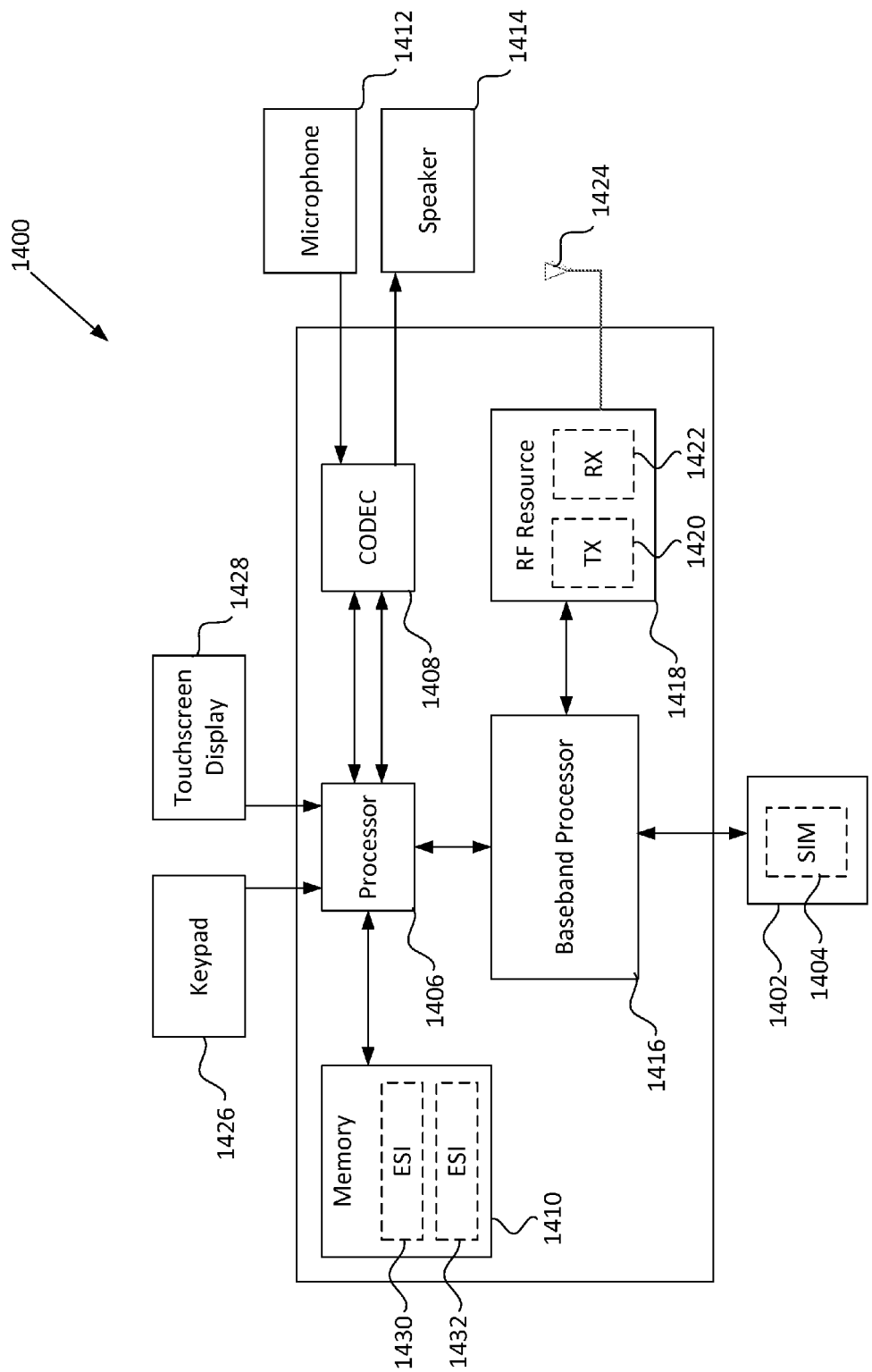
FIG. 14 is a functional block diagram of a mobile device according to various embodiments of the disclosure.

FIG. 14 is a functional block diagram of a mobile device 1400 according to various embodiments of the disclosure. In some embodiments, mobile device 1400 may be used as a mobile telephone as described previously herein.

Mobile device 1400 may include an identity module interface 1402. Identity module interface 1402 may receive an identity module 1404 associated with a subscription for a user of mobile device 1400. In some embodiments, identity module interface 1402 may be a SIM interface and identity module 1404 may be a SIM card.

Mobile device 1400 may include at least one processor 1406. In some embodiments, processor 1406 may be provided as a general purpose processor. Processor 1406 may include any suitable data processing device, such as a general purpose processor (e.g., a microprocessor). In the alternative, processor 1406 may be any suitable electronic processor, controller, microcontroller, or state machine. Processor 1406 may also be implemented as a combination of computing devices, e.g., a combination of a DSP and a microprocessor, a plurality of microprocessors, at least one microprocessor in conjunction with a DSP core, or any other such configuration.

Mobile device 1400 may include a coder/decoder (CODEC) 1408 coupled to processor 1406. CODEC 1408 may in turn be coupled to one or more user interface devices. The user interface device may include a display and a user input device. In various embodiments, the display may include any suitable device that provides a human-perceptible visible signal, audible signal, tactile signal, or any combination thereof. The display may include, but is not limited to, a touchscreen, LCD, LED, CRT, plasma, other suitable display screen, audio speaker 1414, other audio generating device, combinations of the preceding, and the like. In various embodiments, the user input device may include any suitable device that receives input from the user. The user input device may include, but is not limited to, one or more manual operators (such as, but not limited to a switch, button, touchscreen, knob, slider, or the like), microphone 1412, camera, image sensor, combinations of the preceding, and the like.

Mobile device 1400 may include at least one memory 1410 coupled to processor 1406. Memory 1410 may be a non-transitory processor-readable storage medium that stores processor-executable instructions. This medium may include, but is not limited to, random access memory ("RAM"), read only memory ("ROM"), floppy disks, hard disks, dongles, USB connected memory devices, combinations of the preceding, or the like. Memory 1410 may store an operating system ("OS") as well as user application software and executable instructions.

Mobile device 1410 may include at least one baseband processor 1416 coupled to processor 1406. Baseband processor 1416 may be a baseband modem processor. Each identity module in mobile device 1400 (e.g., identity module 1404) may be associated with baseband-RF resources. The RF resources may include at least one baseband-RF resource chain. The baseband-RF resource chain may include baseband processor 1416, which may perform baseband/modem functions for communications on identity module 1404. The baseband-RF resource chain may also include one or more amplifiers and radios, such as RF resource 1418. RF resource 1418 may be a transceiver that performs transmit/receive functions for mobile device 1400. RF resource 1418 may include transmitter 1420 and receiver 1422. RF resource 1418 may include separate transmit and receive circuitry, or it may include a transceiver that combines transmitter and receiver circuitry. RF resource 1418 may be coupled to a wireless antenna 1424 for transmitting and receiving wireless signals across a wireless medium. RF resource 1418 may further be coupled to baseband processor 1416.

In some embodiments, processor 1406, memory 1410, baseband processor 1416, and RF resource 1418 may be included in mobile device 1400 as a system-on-chip. In some embodiments, identity module 1404 and identity module interface 1402 may be external to the system-on-chip. Further, various input and output devices may be coupled to components on the system-on-chip, such as interfaces or controllers. Example user input components suitable for use in mobile device 1400 may include, but are not limited to, a keypad 1426, touchscreen display 1428, and microphone 1412.

In some embodiments, keypad 1426, touchscreen display 1428, microphone 1412, or a combination thereof may receive a request to initiate an outgoing call. For example, touchscreen display 1428 may receive a selection of a contact from a contact list or receive a telephone number. As another example, the request to initiate the outgoing call may be in the form of a voice command received via microphone 1412. Interfaces may be provided between the various software modules and functions in mobile device 1400 to enable communication between them, as is known in the art.

In some embodiments (not shown), mobile device 1400 may include, among other things, additional identity modules (e.g., additional SIM cards), additional identity module interfaces (e.g., additional SIM interfaces), a plurality of RF resources, and additional antennae for connecting to additional mobile networks.

In particular embodiments, memory 1410 may be configured to store processor-executable instructions for performing various features related to the present disclosure, such as emergency services instructions 1430. In particular embodiments, memory 1410 may be further configured to store emergency services information 1432.

In particular embodiments, emergency services instructions 1430 may be effective to cause receiver 1422 to receive emergency services information from a computing device of a cellular network. Emergency services instructions 1430 may be effective to cause processor 1406 to store the received emergency services information in memory 1410 as emergency services information 1432.

In particular embodiments, emergency services instructions 1430 may be effective to cause touchscreen display 1428 to display emergency services information 1432 to a user of mobile device 1400. Emergency services instructions 1430 may cause touchscreen display 1428 to display the emergency services information 1432 in response to input received from the user, such as from keypad 1426, from touchscreen display 1428, or from microphone 1412.

In particular embodiments, emergency services instructions 1430 may be effective to cause transmitter 1420 to transmit an indicator to a computing device of a cellular network, the indicator indicating that the mobile device 1400 has newly entered a geographic area to which the cellular network is related.

In particular embodiments, emergency services instructions 1430 may be effective to cause processor 1406 and RF resource 1418 to place a telephone call to emergency services based on a signal received as a result of displaying emergency services information 1432 on touchscreen display 1428, where the signal may indicate a selection of an emergency services telephone number that the user has chosen to place a call to.

In various embodiments, emergency services instructions 1430 may be effective to cause mobile device 1400 to use emergency services information 1432 and other components of mobile device 1400 to perform various parts of exemplary processes described elsewhere in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A mobile device for the provision of emergency services information, the mobile device comprising:
   a memory configured to store first emergency services information corresponding to a first geographic area and to store a geographic area identifier associated with the first geographic area;
   a processor configured to determine that the mobile device entered a second geographic area different from the first geographic area;
   a transmitter configured to transmit a signal in response to determining that the mobile device entered the second geographic area, the signal requesting registration with a network computer device associated with the second geographic area, or indicating that the mobile device entered the second geographic area;
   a receiver configured to:
      receive geographic area information associated with the second geographic area when the mobile device is in the second geographic area; and
      receive second emergency services information from a network to which the mobile device is in communication upon the mobile device being in the second geographic area, after the transmitter transmits the signal, the second emergency services information being associated with the second geographic area and being different than the first emergency services information, wherein receiving the second emergency services information comprises receiving at least one emergency service telephone number; and a display screen of the mobile device configured to display, in response to input from a user of the mobile device in the second geographic area, at least a portion of the second emergency services information, wherein the memory is further configured to store the second emergency services information, wherein the processor, in determining that the mobile device entered the second geographic area, is configured to compare the received geographic area information with the stored geographic area identifier, and wherein at least a portion of the first emergency services information is to be deleted in response to receiving the second emergency services information.

2. The mobile device of claim 1, wherein the emergency services information comprises:
at least one emergency services telephone number.

3. The mobile device of claim 2,
wherein the second emergency services information further comprise at least one emergency services description corresponding to the at least one emergency services telephone number; and
wherein the display screen is configured to display the at least one emergency services telephone number on the display screen of the mobile device and display the first emergency services description.

4. The mobile device of claim 2, wherein the second emergency services information comprises:
a plurality of emergency services telephone numbers; and
a plurality of emergency services description texts, each emergency services description text in the plurality of emergency services description texts corresponding to an emergency services telephone number in the plurality of emergency services telephone numbers.

5. The mobile device of claim 2, wherein the input from the user of the mobile device comprises a signal received as a result of the user pressing an emergency services dialing button.

6. A mobile device for the provision of emergency services information, the mobile device comprising:
means for storing, on a mobile device, first emergency services information corresponding to a first geographic area and a geographic area identifier associated with the first geographic area;
means for determining that the mobile device entered a second geographic area different from the first geographic area;
means for transmitting, in response to determining that the mobile device entered the second geographic area, a signal requesting registration with a network computer device associated with the second geographic area, or a signal indicating that the mobile device entered the second geographic area;
means for receiving:
geographic area information associated with the second geographic area when the mobile device is in the second geographic area; and
second emergency services information from a network to which the mobile device is in communication upon the mobile device being in the second geographic area, after transmitting the signal, the second emergency services information being associated with the second geographic area and being different than the first emergency services information, wherein receiving the second emergency services information comprises receiving at least one emergency service telephone number; and
means for displaying, in response to input from a user of the mobile device in the second geographic area, at least a portion of the second emergency services information, wherein the means for storing is further to store the second emergency services information, wherein the means for determining, in determining that the mobile device entered the second geographic area, is to compare the received geographic area information with the stored geographic area identifier, and wherein at least a portion of the first emergency services information is to be deleted in response to receiving the second emergency services information.

7. The mobile device of claim 6, the means for displaying further to display the first emergency services description text.

8. The mobile device of claim 6, wherein the second emergency services information comprises:
a plurality of emergency services telephone numbers; and
a plurality of emergency services description texts, each emergency services description text in the plurality of emergency services description texts corresponding to an emergency services telephone number in the plurality of emergency services telephone numbers.

9. A non-transitory computer-readable medium for the provision of emergency services information, the medium comprising instructions that when executed by one or more processors of a mobile device, cause the mobile device to:
store, on a mobile device, first emergency services information corresponding to a first geographic area;
determine that the mobile device entered a second geographic area different from the first geographic area;
transmit, by the mobile device, in response to determining that the mobile device entered the second geographic area, a signal requesting registration with a network computer device associated with the second geographic area, or a signal indicating that the mobile device entered the second geographic area;
receive, at the mobile device:
geographic area information associated with the second geographic area when the mobile device is in the second geographic area; and
second emergency services information from a network to which the mobile device is in communication upon the mobile device being in the second geographic area, after transmitting the signal, the second emergency services information being associated with the second geographic area and being different than the first emergency services information, wherein receiving the second emergency services information comprises receiving at least one emergency service telephone number;
store the second emergency services information and delete at least a portion of the first emergency services information upon receiving the second emergency services information at the mobile device; and
display, in response to input from a user of the mobile device in the second geographic area, at least a portion of the second emergency services information on a display screen of the mobile device,
wherein determining that the mobile device entered the second geographic area comprises comparing the received geographic area information with the stored geographic area identifier.

10. The non-transitory computer-readable medium of claim 9, wherein:
the instructions for receiving the second emergency services information causes the mobile device to receive at least one emergency services description corresponding to the at least one emergency services telephone number; and
the instructions for displaying at least a portion of the second emergency services information causes the mobile device to displaying the at least one emergency services telephone number on the display screen of the mobile device and to display the at least one emergency services description on the display screen of the mobile device.

11. The non-transitory computer-readable medium of claim 10,
wherein the input from the user of the mobile device comprises a signal received as a result of the user depressing and holding a button provided on the mobile device,
wherein the button is predefined to correspond to a first type of emergency services, and
wherein the at least one emergency services telephone number and at least one emergency services description correspond to the first type of emergency services.

12. The non-transitory computer-readable medium of claim 9, wherein the second emergency services information comprises:
a plurality of emergency services telephone numbers; and
a plurality of emergency services description texts, each emergency services description text in the plurality of emergency services description texts corresponding to an emergency services telephone number in the plurality of emergency services telephone numbers.

13. A method for the provision of emergency services information, the method comprising:
storing, on a mobile device, first emergency services information corresponding to a first geographic area;
determining that the mobile device entered a second geographic area different from the first geographic area;
transmitting, by the mobile device, in response to determining that the mobile device entered the second geographic area, a signal requesting registration with a network computer device associated with the second geographic area, or a signal indicating that the mobile device entered the second geographic area;
receiving second emergency services information at the mobile device from a network to which the mobile device is in communication upon the mobile device being in the second geographic area and after the signal has been transmitted, the second emergency services information being associated with the second geographic area and being different than the first emergency services information;
storing the second emergency services information and deleting at least a portion of the first emergency services information upon receiving the second emergency services information at the mobile device; and
displaying, in response to input from a user of the mobile device in the second geographic area, at least a portion of the second emergency services information on a display screen of the mobile device;
wherein receiving the second emergency services information comprises receiving at least one emergency service telephone number; and
wherein determining that the mobile device entered the second geographic area comprises:
storing a geographic area identifier associated with the first geographic area;
receiving geographic area information associated with the second geographic area when the mobile device is in the second geographic area; and
determining that the mobile device entered the second geographic region by comparing the received geographic area information with the stored geographic area identifier.

14. The method of claim 13,
wherein receiving the second emergency services information further comprise receiving at least one emergency services description corresponding to the at least one emergency services telephone number; and
wherein displaying at least a portion of the second emergency services information comprises displaying:
the at least one emergency services telephone number on the display screen of the mobile device, and
displaying the at least one emergency services description on the display screen of the mobile device.

15. The method of claim 14,
wherein the input from the user of the mobile device comprises a signal received as a result of the user depressing and holding a button provided on the mobile device,
wherein the button is predefined to correspond to a first type of emergency services, and
wherein the at least one emergency services telephone number and at least one emergency services description correspond to the first type of emergency services.

16. The method of claim 13, wherein the second emergency services information comprises:
a plurality of emergency services telephone numbers; and
a plurality of emergency services description texts, each emergency services description text in the plurality of emergency services description texts corresponding to an emergency services telephone number in the plurality of emergency services telephone numbers.

17. The method of claim 16, wherein displaying at least a portion of the second emergency services information comprises displaying one or more emergency services description texts in the plurality of emergency services description texts on the display screen of the mobile device.

18. The method of claim 17, wherein the input from the user of the mobile device comprises a signal received as a result of the user pressing an emergency services dialing button.

19. The method of claim 13, wherein transmitting comprises transmitting the signal, by the mobile device, in response to determining that the mobile device recently entered the second geographic area.

20. The method of claim 13, wherein the geographic area identifier associated with the first geographic region comprises: information indicating a home geographic area associated with the mobile device, or information indicating a geographic area for which the mobile device recently received the first emergency services information.

21. A method for the provision of emergency services information, the method comprising:
storing, on a mobile device, first emergency services information corresponding to a first geographic area;
determining that the mobile device entered a second geographic area different from the first geographic area;
transmitting, by the mobile device, in response to determining that the mobile device entered the second geographic area, a signal requesting registration with a network computer device associated with the second geographic area, or a signal indicating that the mobile device entered the second geographic area;

receiving second emergency services information at the mobile device from a network to which the mobile device is in communication upon the mobile device being in the second geographic area and after the signal has been transmitted, the second emergency services information being associated with the second geographic area and being different than the first emergency services information; and displaying, in response to input from a user of the mobile device in the second geographic area, at least a portion of the second emergency services information on a display screen of the mobile device;

wherein receiving the second emergency services information comprises receiving at least one emergency service telephone number;

wherein determining that the mobile device entered the second geographic area
comprises:

storing a geographic area identifier associated with the first geographic area;

receiving geographic area information associated with the second geographic area when the mobile device is in the second geographic area; and determining that the mobile device entered the second geographic region by comparing the received geographic area information with the stored geographic area identifier; and wherein the geographic area information comprises a Mobile Country Code.

* * * * *